No. 798,856. PATENTED SEPT. 5, 1905.
H. J. WETTER.
GANG TOOL HOLDER.
APPLICATION FILED JULY 25, 1904.
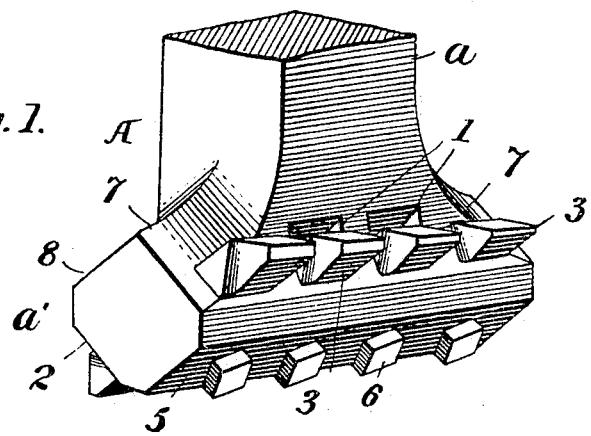
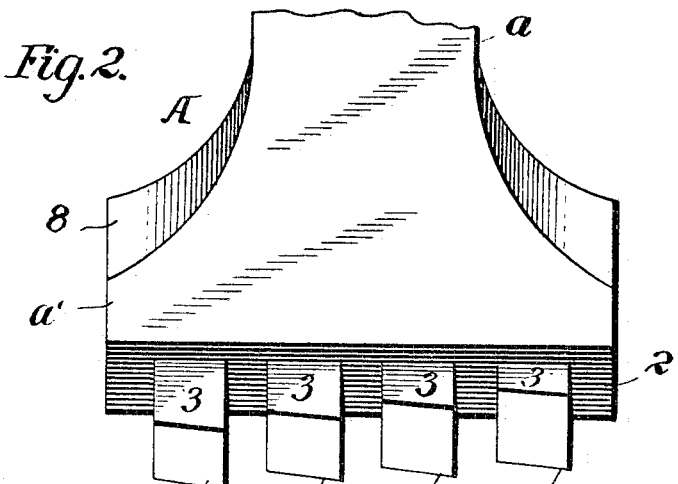
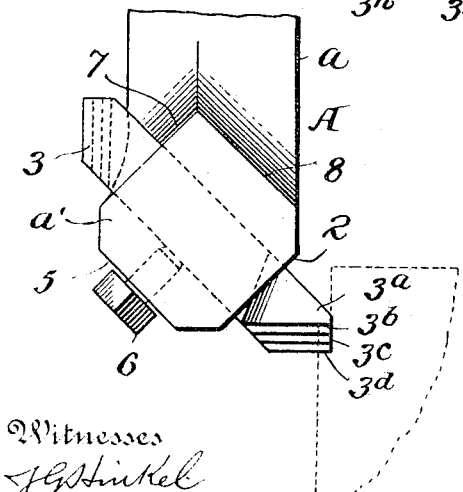
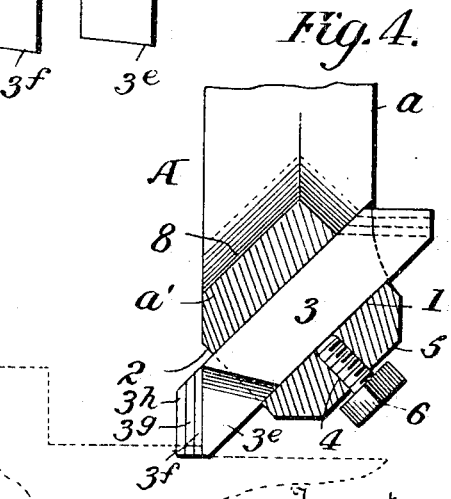

UNITED STATES PATENT OFFICE.

HENRY J. WETTER, OF SCRANTON, PENNSYLVANIA.

GANG-TOOL HOLDER.

No. 798,856.     Specification of Letters Patent.     Patented Sept. 5, 1905.

Application filed July 25, 1904. Serial No. 218,157.

*To all whom it may concern:*

Be it known that I, HENRY J. WETTER, a citizen of the United States, residing at Scranton, in the county of Lackawanna and State of Pennsylvania, have invented certain new and useful Improvements in Gang-Tool Holders, of which the following is a specification.

My invention relates to improved gang-tool holders having certain advantages, which will be pointed out in the following specification, taken in connection with the accompanying drawings, in which—

Figure 1 is a perspective view of the tool-holder, the upper part of the shank being cut off. Figs. 2 and 3 are front and end views, respectively, of the holder, the latter showing the tools arranged to cut vertically and parallel with the plane of the tool-shank; and Fig. 4 is a side view of the tool-holder, the head being shown in transverse section and the tools being arranged to cut horizontally or at right angles to the plane of the shank.

Referring to the drawings, A indicates the gang-tool holder, which comprises a shank $a$, preferably rectangular in cross-section and adapted to be clamped or otherwise suitably secured to the planer or other machine on which it is used, and a head $a'$, in which the cutting-tools are secured.

The distinctive feature of my invention is the head of the holder and the manner of securing the tools therein. As shown in the drawings, the head is flush with the shank on the front side and projects slightly beyond the shank at the rear and the ends of the head project laterally at the sides of the shank. The head and shank are, as shown, integrally connected. The lower or outer end of the head tapers from the sides toward the central plane of the head instead of extending straight down parallel with the shank. A longitudinal series of parallel tool-slots 1, arranged at suitable distances apart, extend diagonally through the head from its rear side, said slots terminating in the straight inclined face 2, as shown in the drawings. The tool-shank shown in the drawings is straight and the slots are arranged at an angle of forty-five degrees to the general direction of the shank. Each tool-slot is adapted to receive a cutting-tool 3, and the slots are arranged in a straight line parallel with the cutting movement of the holder relatively to the work, so that if the cutting ends of all the tools were alike they would all engage the work in a straight line and follow one another. Threaded openings 4 extend from the opposite inclined faces 5 of the head to the tool-slots, and within these openings are arranged set-screws 6, which when tightened bear against the tools and hold them securely in place. The parts of the head (shown in the drawings) which project laterally beyond the shank also have inclined faces 7 and 8 at their inner or upper sides; but the inclination of the faces 7 and 8 is, however, not material, except that a head of sufficient strength is thus formed without a surplus of metal.

The tools 3 in practice are ground so that one end of each tool will cut from right to left, while the other end will cut from left to right by inverting the tools in the holder, the latter remaining stationary. The feed of the tools is regulated by grinding off the points to a greater or less extent. By grinding off the points of the tools shown in Fig. 3 vertically it will be seen that the downward feed of the tools in planing a vertical face is regulated by the amount ground off of the point of the tool. In said figure the dotted lines indicate the work, and the tool-points $3^a$, $3^b$, $3^c$, and $3^d$ have successively greater amounts ground off of their right-hand ends, and therefore extend downward to successively greater distances and make successive cuts in the work.

In Figs. 2 and 4 the tools there shown have successively greater amounts ground off of their points $3^e$ $3^f$ $3^g$ $3^h$, and the tools therefore are fed to successively greater distances at right angles to the plane of the shank for planing off horizontal surfaces.

It will be seen that by forming the holder with the beveled face 2 the cutting ends of the tools may work close to and even under the head of the holder in working on either a horizontal or vertical surface, and the tools will be held rigidly against the work by the head.

In planing horizontally the tools may be drawn back until the last tool in the series is flush with the face of the holder and all of the tools will be in the cutting position even when the front of the holder is against the vertical face of the work.

In cutting vertically the tools may be drawn back into the holder until the lower end of the last tool in the series is practically flush with the outer end of the holder, and all of the tools will still be in position for cutting vertically. For this reason the tool-holder is especially desirable for working in corners where the faces of the work are at right angles and in channels or narrow quarters where it is necessary or desirable to run the holder close to the work.

As the tool-slots are in a straight line parallel with the line of movement of the holder relatively to the work, the holder is suitable for working backward or forward by simply reversing the tools in the slots, so that the points will suit the direction of movement of the holder.

The lower inclined faces of the holder allow the latter to pass by and through the metal clips or cuttings removed by the tools, an accumulation of which in a narrow slot or channel would be forced ahead of the holder and jammed between the holder and the end and sides of the channel if the head were rectangular, so that it would practically fill the channel.

Having described my invention, what I claim, and desire to secure by Letters Patent, is—

A gang-tool holder comprising a shank and a head integral therewith, said head having two longitudinally-extending faces beveled or inclined in opposite directions from the sides of the head toward its outer end, and having a longitudinal series of parallel tool-slots extending diagonally therethrough, from the rear side of the head through the beveled face on the front side of the head, said slots being arranged at an angle of substantially forty-five degrees to the general direction of the shank and in a line parallel with the direction in which the holder moves relatively to the work in cutting, and having threaded openings extending from the beveled face at the rear side of the head to the tool-slots, and set-screws within said openings.

In testimony whereof I affix my signature in presence of two witnesses.

HENRY J. WETTER.

Witnesses:
R. LOUIS GRAMBS,
CHARLES H. GENTER.